United States Patent
Farley et al.

(10) Patent No.: US 11,831,552 B1
(45) Date of Patent: Nov. 28, 2023

(54) LCS RESOURCE DEVICE ACCESS CONTROL AND MANAGEMENT SYSTEM

(71) Applicant: Dell Products L.P., Round Rock, TX (US)

(72) Inventors: Douglas Lang Farley, Round Rock, TX (US); Gaurav Chawla, Austin, TX (US); John Harwood, Boston, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/868,069

(22) Filed: Jul. 19, 2022

(51) Int. Cl.
*H04L 47/2425* (2022.01)
*H04L 47/762* (2022.01)
*H04L 47/70* (2022.01)

(52) U.S. Cl.
CPC ........ *H04L 47/2433* (2013.01); *H04L 47/762* (2013.01); *H04L 47/821* (2013.01); *H04L 47/827* (2013.01)

(58) Field of Classification Search
CPC . H04L 47/2433; H04L 47/762; H04L 47/821; H04L 47/827
See application file for complete search history.

(56) References Cited

U.S. PATENT DOCUMENTS

| | | | |
|---|---|---|---|
| 8,359,223 B2 | 1/2013 | Chi et al. | |
| 2018/0329768 A1* | 11/2018 | Bikumala | G06F 11/079 |
| 2019/0132258 A1* | 5/2019 | Hu | H04L 47/805 |
| 2020/0341793 A1* | 10/2020 | Iyer | G06F 9/45558 |

* cited by examiner

*Primary Examiner* — Jung H Park
(74) *Attorney, Agent, or Firm* — Joseph Mencher

(57) ABSTRACT

An LCS resource device access control and management system having a resource system including an orchestrator device coupled to a resource management system and resource devices. The orchestrator device receives an identification from the resource management system of the resource devices for providing an LCS, and Service Level Agreement (SLA) information defining an SLA for the LCS. The orchestrator device uses the SLA information for the LCS to monitor each of the resource devices during their providing of the LCS and, in response, identifies a first resource device that is performing first resource device functionality that is not satisfying the SLA for the LCS. In response, the orchestrator device provides the LCS using a second resource device that performs second resource device functionality that satisfies the SLA for the LCS in place of the first resource device.

20 Claims, 10 Drawing Sheets

LCS RESOURCE DEVICE ACCESS CONTROL AND MANAGEMENT SYSTEM

BACKGROUND

The present disclosure relates generally to information handling systems, and more particularly to managing and controlling access to resource devices for a Logically Composed System (LCS) provided using an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, LCSs are often provided using Bare Metal Server (BMS) systems or other resource systems known in the art, with resource devices included within and/or outside of those resource systems (e.g., processing devices and memory devices on a motherboard in the BMS system used to provide an Operating System (OS) for the LCS, storage devices, networking devices, etc.) used to perform the functionality for the LCSs, and often dynamically changing over the time period in which the LCS is provided. Furthermore, orchestrator devices in the BMS systems may orchestrate the provisioning of those LCSs while also including resource devices that may be utilized to provide the functionality of those LCSs. As such, LCSs are disaggregated systems and their associated functionality may be enabled from a variety of different sources and locations (e.g., from resource devices within the BMS system discussed above, resource devices included on the orchestrator device in the BMS system discussed above, resource devices outside the BMS system discussed above, etc.). As will be appreciated by one of skill in the art in possession of the present disclosure, in many situations LCSs may share one or more resource devices which can raise security issues, Quality of Service (QoS) issues, and/or other shared resource issues known in the art.

Accordingly, it would be desirable to provide an LCS resource device access control and management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an orchestrator engine that is configured to: receive, from a resource management system, an identification of a plurality of resource devices for providing an LCS, and Service Level Agreement (SLA) information defining an SLA for the LCS; monitor, using the SLA information for the LCS, each of the plurality of resource devices during their providing of the LCS; identify, in response to the monitoring of each of the plurality of resource devices during their providing of the LCS, a first resource device that is included in the plurality of resource devices and that is performing first resource device functionality that is not satisfying the SLA for the LCS; and provide, in response to identifying the first resource device that is performing the first resource device functionality that is not satisfying the SLA for the LCS, the LCS using a second resource device that performs second resource device functionality that satisfies the SLA for the LCS in place of the first resource device that was performing the first resource device functionality that was not satisfying the SLA for the LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
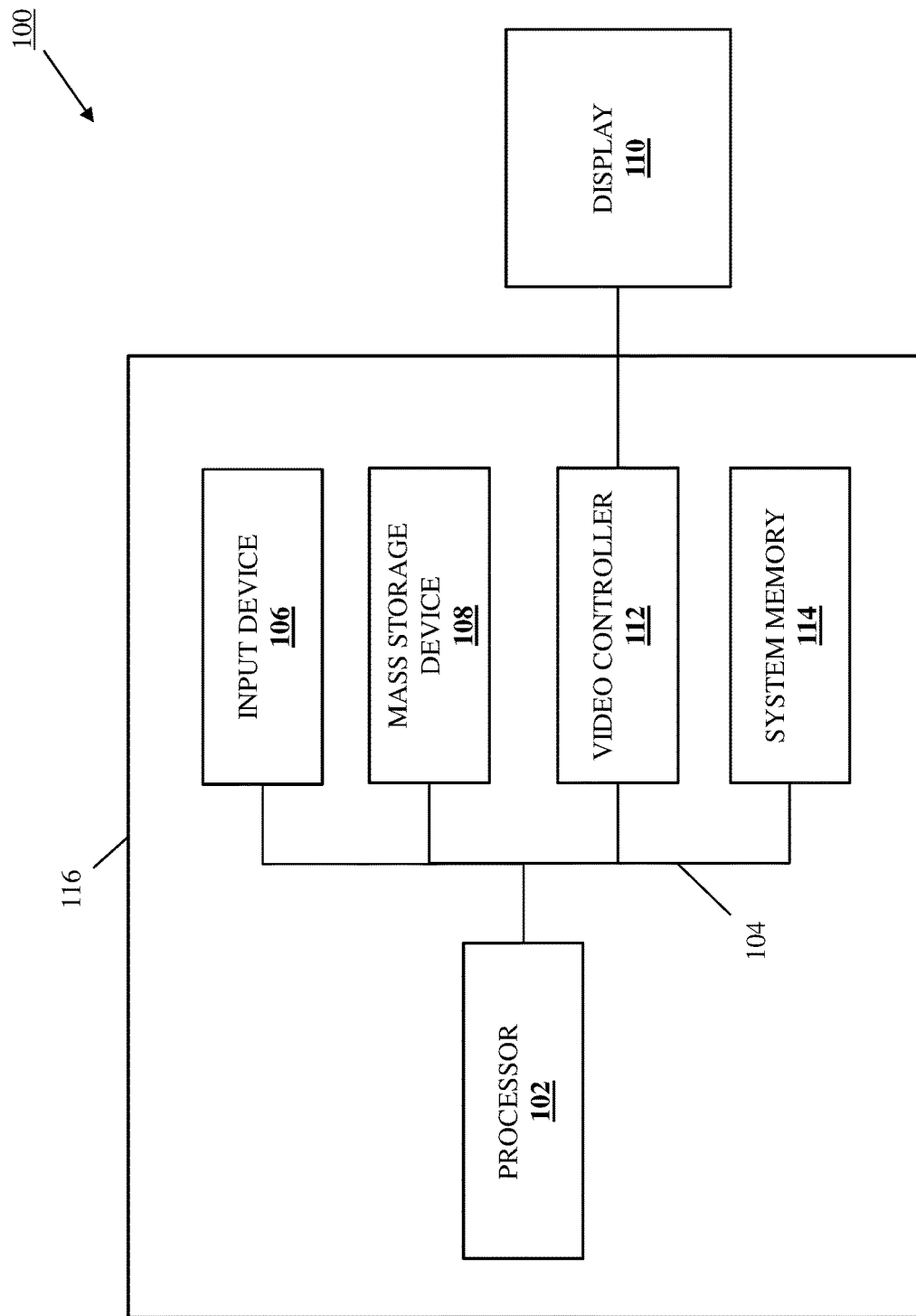
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) resource device access control and management systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
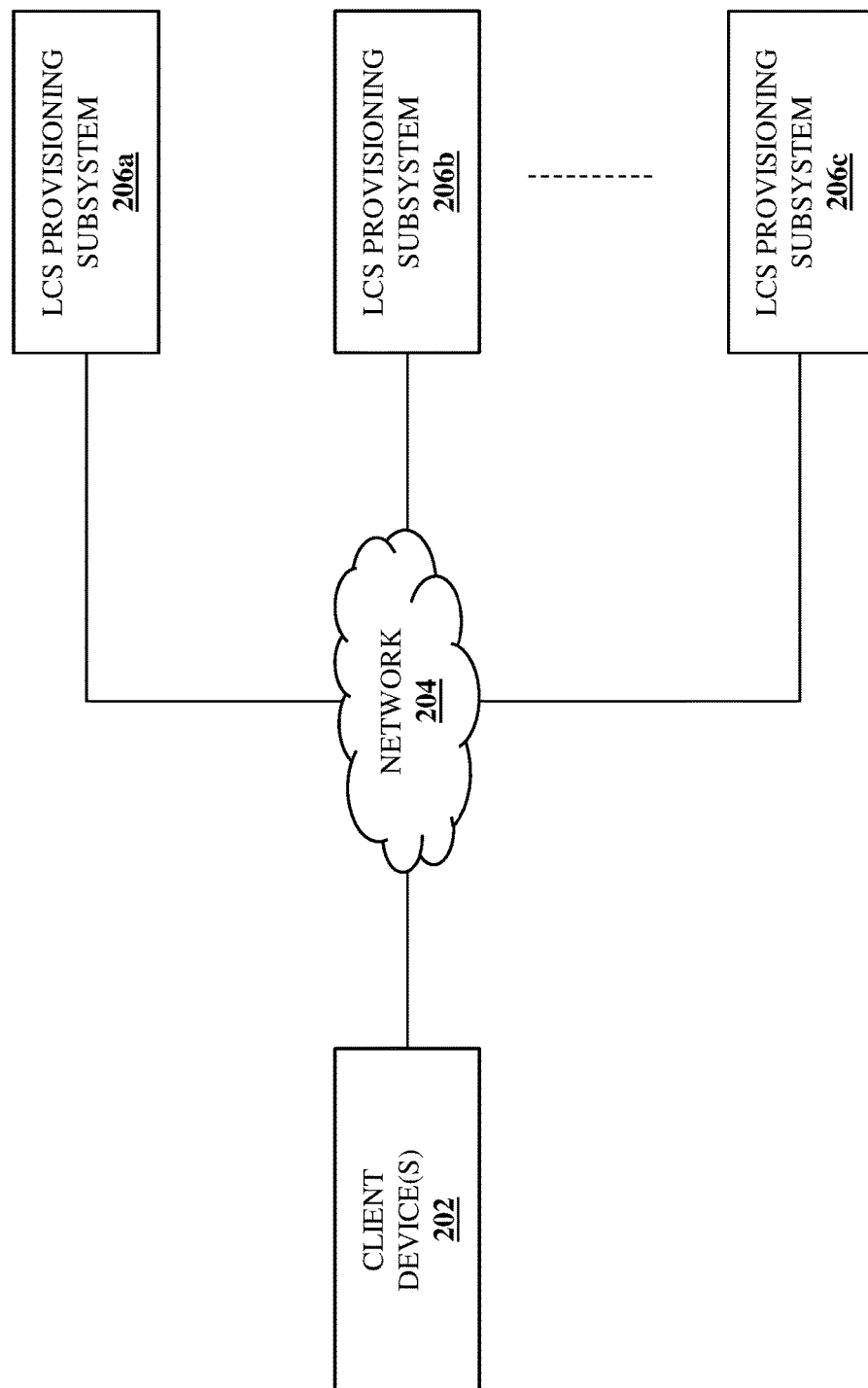
FIG. 2 is a schematic view illustrating an embodiment of an LCS provisioning system.

With reference to FIG. 2, an embodiment of an LCS provisioning system 200 is illustrated that may be utilized with the LCS resource device access control and management systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
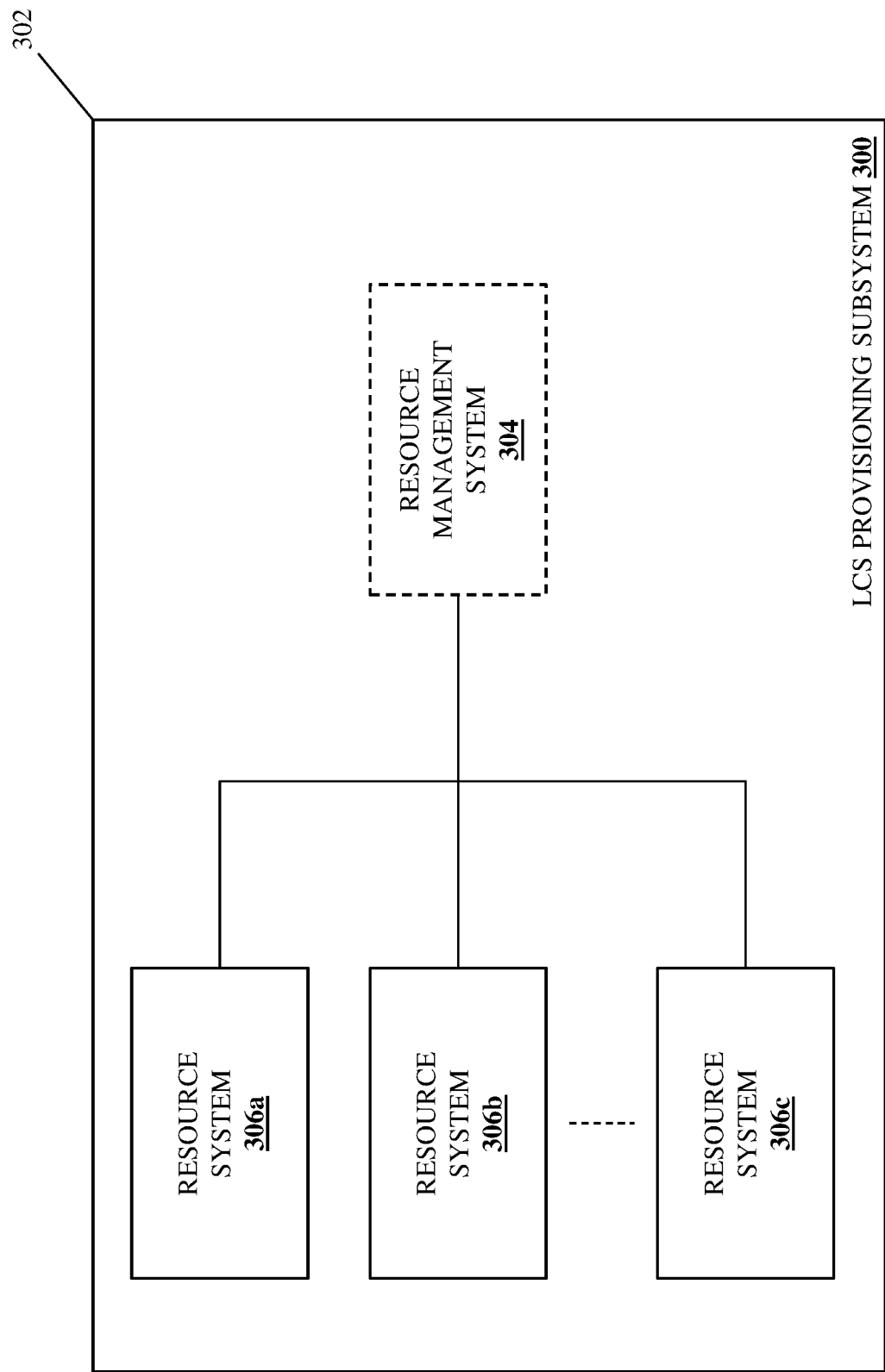
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein. However, while described as being provided by an SCP device or DPU device, one of skill in the art in possession of the present disclosure will appreciate how the orchestrator device of the present disclosure may also be provided by other devices that have been configured to perform the orchestrator functionality described below while remaining within the scope of the present disclosure as well.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
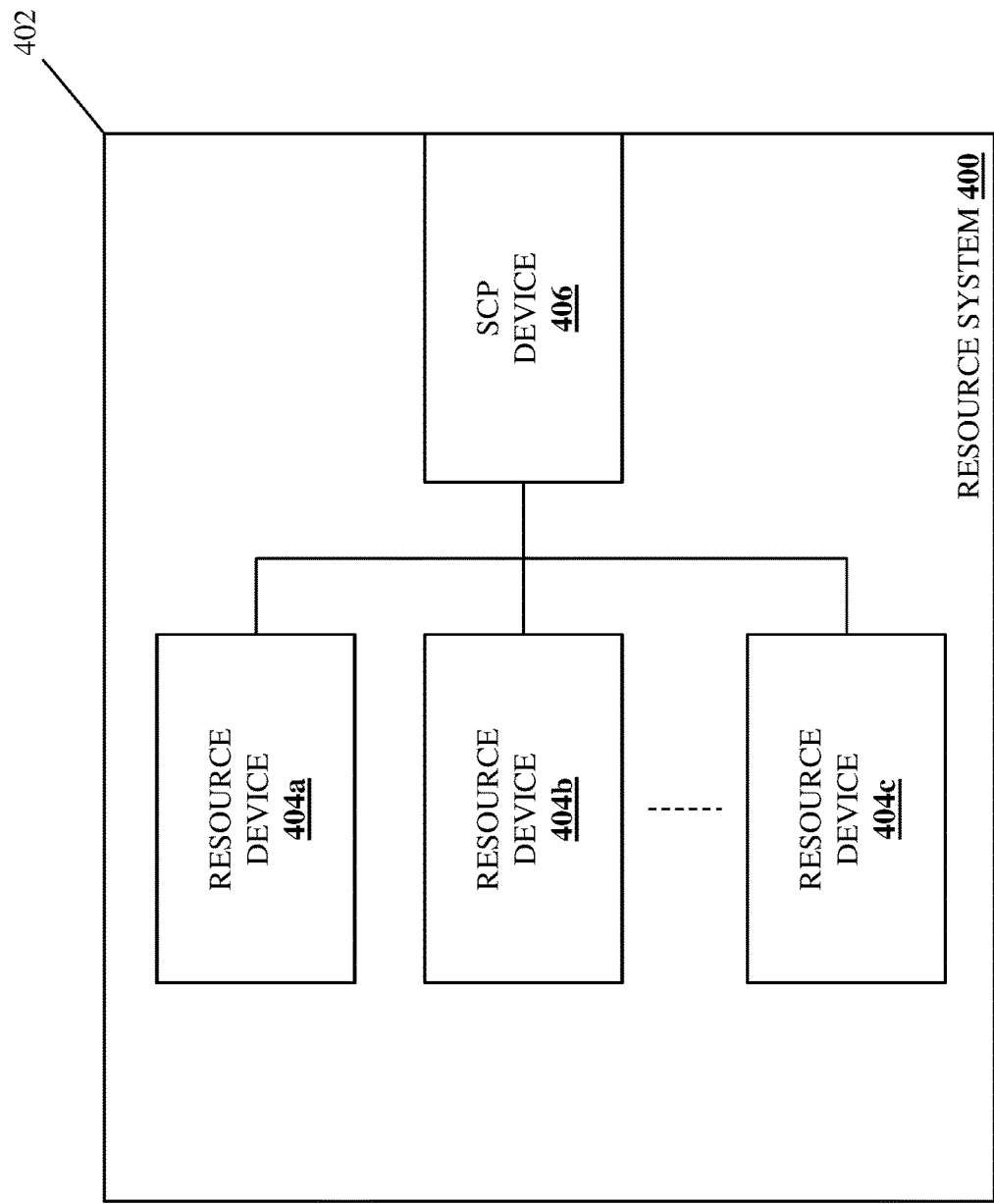
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (IO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
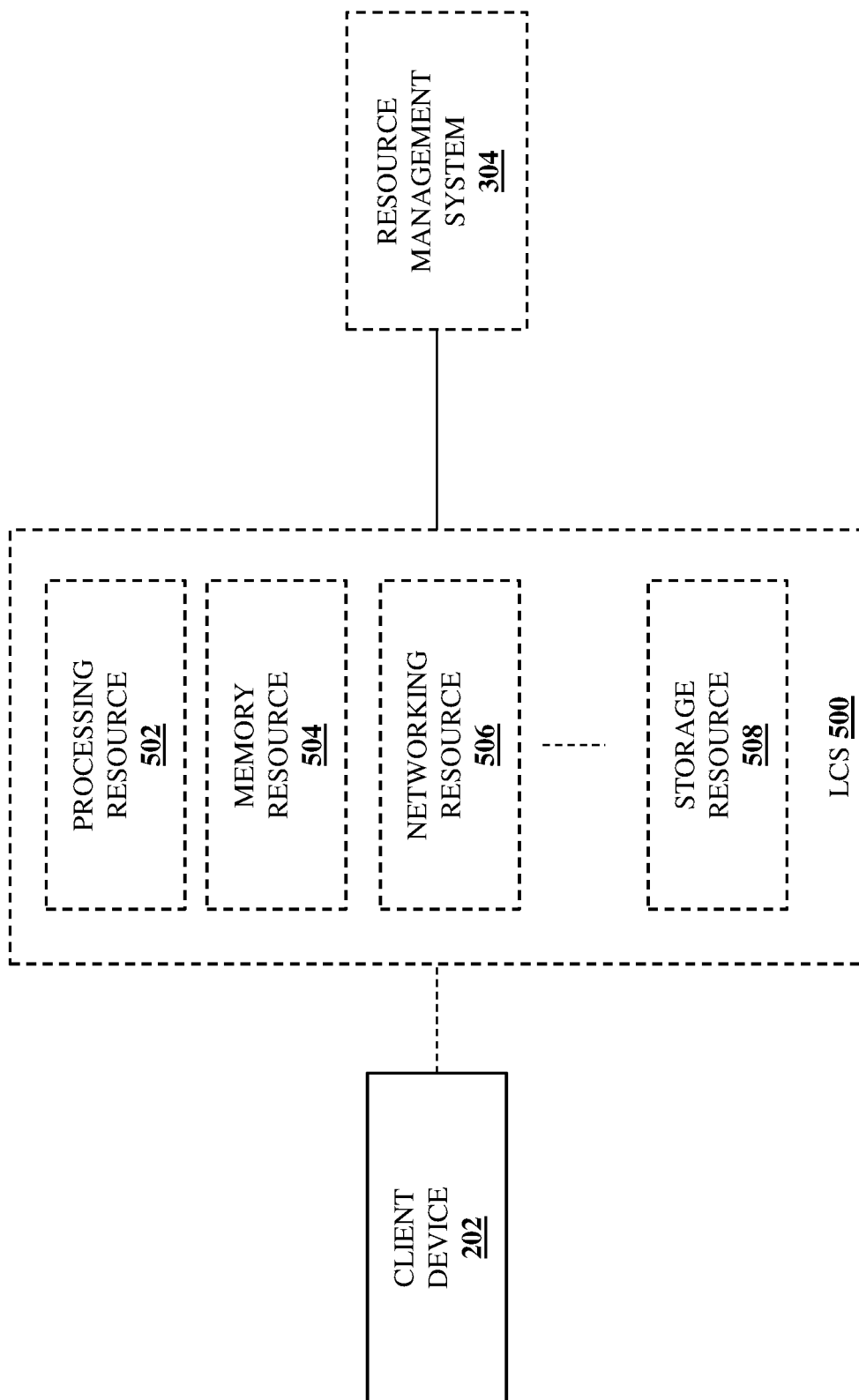
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TBs of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TBs of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
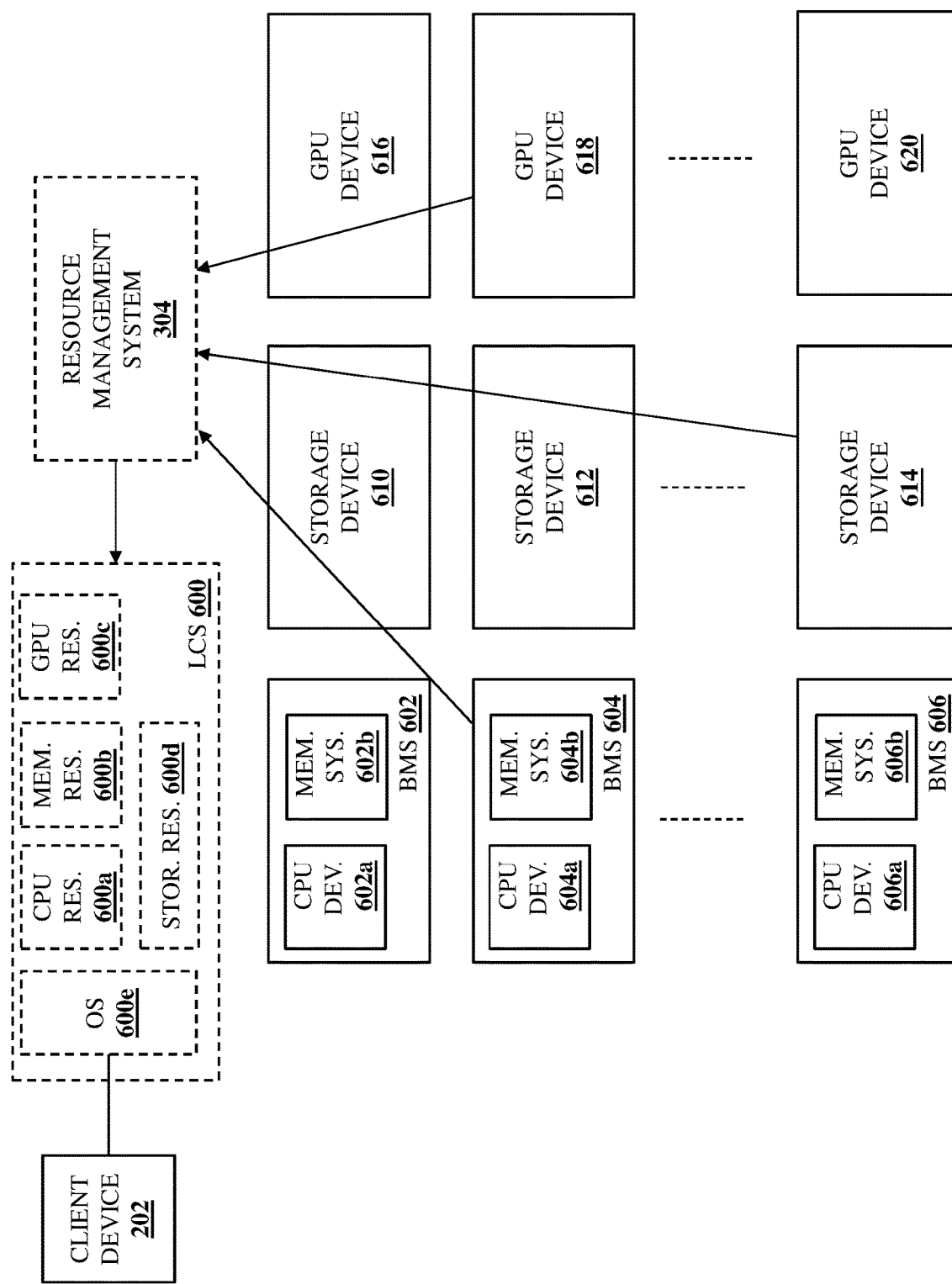
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/ time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
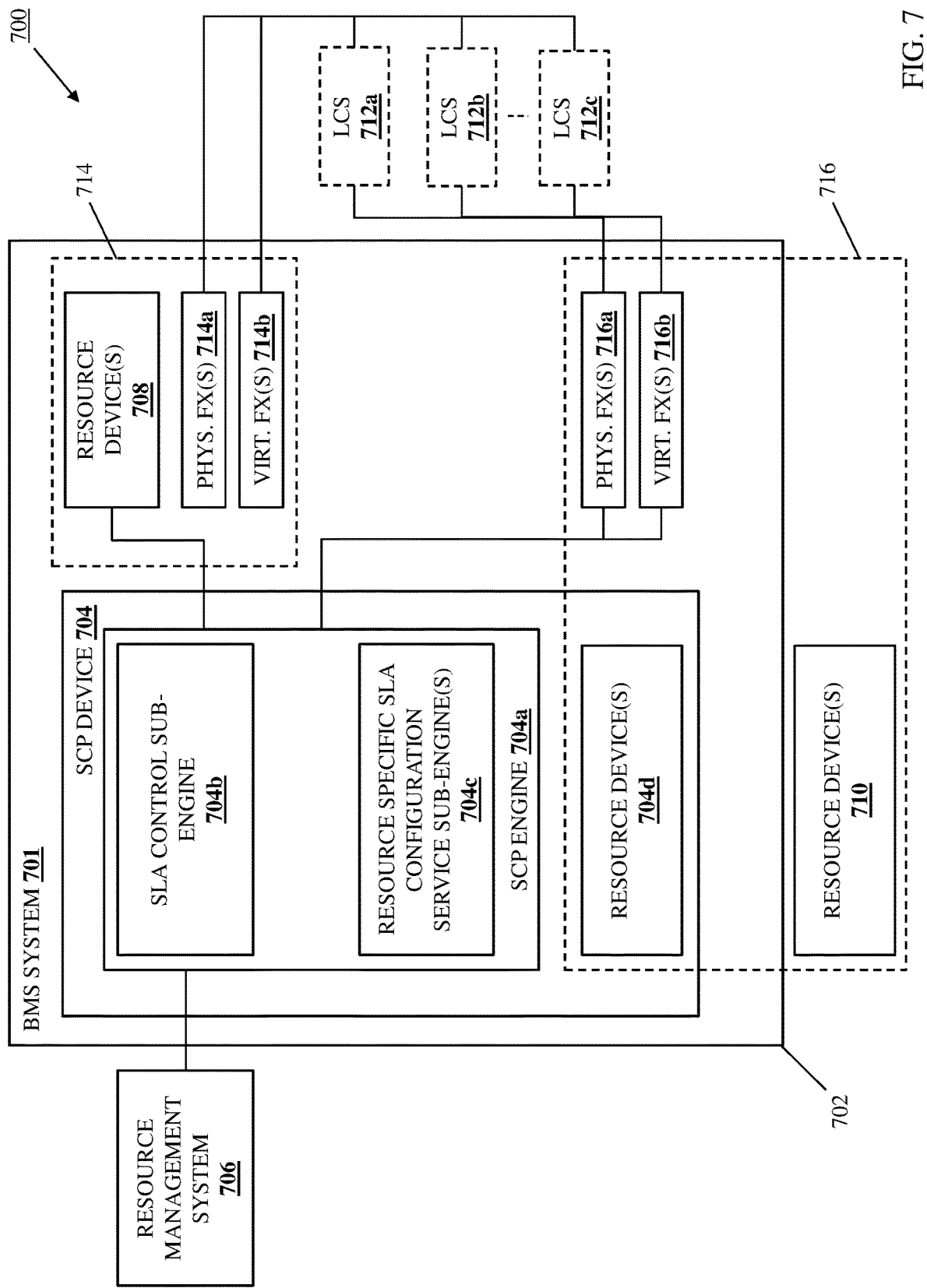
FIG. 7 is a schematic view illustrating an embodiment of an LCS resource device access control and management system provided according to the teachings of the present disclosure.

Referring now to FIG. 7, an embodiment of a LCS resource device access control and management system 700 is illustrated that may be provided according to the teachings of the present disclosure, and one of skill in the art in possession of the present disclosure will appreciate how the LCS resource device access control and management system 700 may be implemented in the LCS provisioning systems discussed above. In an embodiment, the LCS resource device access control and management system 700 includes a resource system that is illustrated as being provided by a BMS system 701, which may include any of the resource systems 306a-306c and 400, and/or BMS systems 602-606 discussed above. The BMS system 701 includes a chassis 702 that houses the components of the BMS system 701, only some of which are illustrated and discussed below. For example, the chassis 702 may house an orchestrator device that is illustrated in FIG. 7 as being provided by an SCP device 704, but that one of skill in the art in possession of the present disclosure will appreciate may be provided by the DPU devices discussed above while remaining within the scope of the present disclosure as well.

In an embodiment, the SCP device 704 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine 704a that is configured to perform the functionality of the SCP engines and/or SCP devices discussed below. In the specific example illustrated in FIG. 7, the memory system in the SCP device 704 includes instructions that, when executed by the processing system, cause the processing system to provide an SLA control sub-engine 704b and one or more resource-specific SLA configuration service sub-engine(s) 704d in the SCP engine 704a that are configured to perform the functionality of the SLA control sub-engines, resource-specific SLA configuration service sub-engines, and/or SCP engines discussed below. Furthermore, while only SLA-related engines are illustrated as being included in the SCP device 704, one of skill in the art in possession of the present disclosure will appreciate that the SCP engines for performing the SCP functions discussed above will be included in the SCP device 704 as well.

As illustrated, the SCP device 704 may also include one or more resource device(s) 704d, which may include the processing system and memory system discussed above, as well as accelerator devices, storage devices (e.g., Non-Volatile Memory express (NVMe) storage devices), networking devices (e.g., Network Interface Controller (NIC) devices), and/or any other orchestrator/SCP/DPU devices that would be apparent to one of skill in the art in possession of the present disclosure. However, while a specific SCP device 704 has been illustrated and described, one of skill in the art in possession of the present disclosure will recognize that the orchestrator devices/SCP devices/DPU devices of the present disclosure may include a variety of components and/or component configurations for enabling the functionality described herein, and thus those components and/or component configurations are envisioned as falling within the scope of the present disclosure as well.

The also includes a resource management system 706 that may be provided by the resource management system 304 discussed above (e.g., an SCPM device, a DPUM device, etc.) The SCP engine 704a is coupled to the resource management system 706 (e.g., via a coupling between the resource management system 706 and the processing system that provides the SCP engine 704a) in a manner that allows the SCP device 704/resource management system 706 functionality discussed above, as well as the SCP device 704/resource management system 706 functionality described below.

In the illustrated embodiment, the chassis 702 of the BMS system 701 houses one or more resource device(s) 708, which may include any of the resource devices 404a-404c discussed above (e.g., processing devices, memory devices, storage devices, networking devices, etc.). As illustrated, the SCP engine 704a may be coupled to the resource device(s) 708, and as discussed below the coupling of the SCP engine 704a and resource device(s) 708 may be provided by a "side-band", "out-of-band", or "management" connection. The LCS resource device access control and management system 700 also includes one or more resource devices 710 that are located outside of the chassis 702 of the BMS 701, and while not illustrated in FIG. 7, the resource devices 710 may be connected to the SCP device 704 via a network that as discussed above.

FIG. 7 provides an example of the SCP device 704 operating to provide a plurality of LCSs 712a, 712b, and up to 712c using the resource device(s) 704d that are part of the SCP device 704 (e.g., included on or directly connected to a motherboard in the SCP device 704), the resource device(s) 708 that are included in the chassis 702 of the BMS system 701 but that are not part of the SCP device 704, and the resource device(s) 710 that are located outside of the chassis 702 of the BMS system 701 and that are connected to the SCP device 704 via the network as discussed above. In the illustrated embodiment, the provisioning of the LCSs 712a-712c includes presenting services/functionality 714 provided by the resource device(s) 708 via the use of physical function(s) 714a ("PHYS. FX(S)") and virtual functions 714b ("VIRT. FX(S)") that may be utilized by the LCSs 712a-712c. As will be appreciated by one of skill in the art in possession of the present disclosure, the presentment of the resource device(s) 708 to LCSs via the use of the physical function(s) 714a and virtual functions 714b operates to provide for access control to those resource device(s) 708, as only the LCSs presented any particular physical function 714a or virtual function 714b will be able to access its corresponding resource device.

For example, a respective physical function 714a or virtual function 714b may be provided for each of the resource device(s) 708 and presented to the LCSs 712a-712c for use in their operations. However, in a conventional BMS system 701, the SCP device 704 may have a relatively limited capabilities with regard to the control of the resource device(s) 708, and thus may present any one of them to a respective one of the LCSs 712a-712c in an "all-or-nothing" manner such that all of the services/functionality of that resource device 708 is only available that LCS. As will be appreciated by one of skill in the art in possession of the present disclosure, BMS-native resource devices like the resource device(s) 708 illustrated in FIG. 7 are not intended to be managed by a third-party device like the orchestrator device/SCP device/DPU device of the present disclosure, and are typically managed by a processing system in the BMS system 701, and thus are subject to the "all-or-nothing" presentment to a particular LCS. As such, the LCS resource device access control and management system 700 is limited in its ability to present the resource device(s) 708 to LCSs, thus introducing limitations in user/client device/LCS access control to those resource device(s) 708 and management (e.g., resource device QoS enforcement) of those resource device(s). However, as discussed below, the inventors of the present disclosure have developed modifications to BMS systems to address such limitations.

In the illustrated embodiment, the provisioning of the LCSs 712a-712c also includes presenting services/functionality 716 of the resource device(s) 704d that are part of the SCP device 704 and the resource device(s) 704d that are located outside of the chassis 702 of the BMS system 701 and coupled to the SCP device 704 through a network via the use of physical function(s) 716a ("PHYS. FX(S)") and virtual functions 716b ("VIRT. FX(S)") that may be utilized by the LCSs 712a-712c. For example, a respective physical function 716a or virtual function 716b may be provided for services/functionality provided by each of the resource device(s) 704d and 710, or portions thereof, and presented to the LCSs 712a-712c for use in their operations. As will be appreciated by one of skill in the art in possession of the present disclosure, the presentment of the resource device(s) 704d and/or 710 (or portions thereof) to LCSs via the use of the physical function(s) 716a and virtual functions 716b operates to provide for access control to those resource device(s) 704d and/or 710, as only the LCSs presented any particular physical function 716a or virtual function 716b will be able to access its corresponding resource device. However, while a specific LCS resource device access control and management system 700 has been illustrated and described, one of skill in the art in possession of the present disclosure will recognize that the LCS resource device access control and management system of the present disclosure may include a variety of components and/or component configurations for providing conventional LCS provisioning functionality, as well as the functionality discussed below, while remaining within the scope of the present disclosure as well.

As discussed in further detail below, the presentation of the resource device(s) 704d that are included on the SCP device 704 and the resource device(s) 704d that are located outside of the chassis 702 of the BMS system 701 and coupled to the SCP device 704 through a network is not as limited as the resource device(s) 708 that are included in the chassis 702 of the BMS system 701 but that are not part of the SCP device 704, as the SCP device 704 has relatively more control over those resource device(s) 704d and 710. However, the presentation of those resource device(s) 704d and 710 by the SCP device 704 still suffers from some issues. As will be appreciated by one of skill in the art in possession of the present disclosure, the SCP device 704 has the ability to control the resource devices 704d and 710 to a degree that allows services/functionality provided by each of the resource device(s) 704d and 710, or portions thereof, to be presented to the LCSs 712a-712c as separate physical functions 716a and/or virtual functions 716b (e.g., processing services/functionality provided by a processor core in a processing system, networking bandwidth provided by networking ports in a networking device, PCIe bandwidth provided by PCIe devices, etc., may be presented as separate physical functions and/or virtual functions by the SCP device 704). However, the presentation of resource devices as physical functions and/or virtual functions requires physical resources in the SCP device 704, and thus hardware/resource limitations in the SCP device 704 will provide an "upper limit" on the number of physical functions and/or virtual functions that the SCP device 704 may present to the LCSs 712a-712c. As such, limitations in user/client device/LCS access control and management (e.g., resource device QoS enforcement) of the resource device(s) 704d and 710 is present in the LCS resource device access control and management system 700 as well. However, as discussed below, the inventors of the present disclosure have developed modifications to BMS systems to address such limitations.

As such, the LCS resource device access control and management system 700 allows for the use of the orchestrator device/SCP device/DPU device of the present disclosure with a conventional BMS system in order to provide the LCS resource device access control and management functionality described herein, but suffers from the issues/limitations discussed above that may result in access control issues and/or management issues (e.g., QoS enforcement issues) with the resource devices 708 (e.g., via their "all-or-nothing" presentment to the LCSs 712a-712c) and the resource devices 704d and 710 (e.g., via the inability to provide relatively high levels of granularity in the presentment of services/functionality provided by those resource devices to different LCSs 712a-712b). However, as discussed below, while the LCS resource device access control and management system 700 is described as providing for bifurcated control of resource devices (e.g., control of the resource device(s) 708 by the processing system in the BMS system 701, and control of the resource device(s) 704d and 710 by the SCP device 704), the inventors of the present disclosure have developed techniques for addressing those issues by modifying the BMS system to provide a control subsystem that eliminates the issues/limitations with the conventional BMS systems discussed above.

Figure 8:
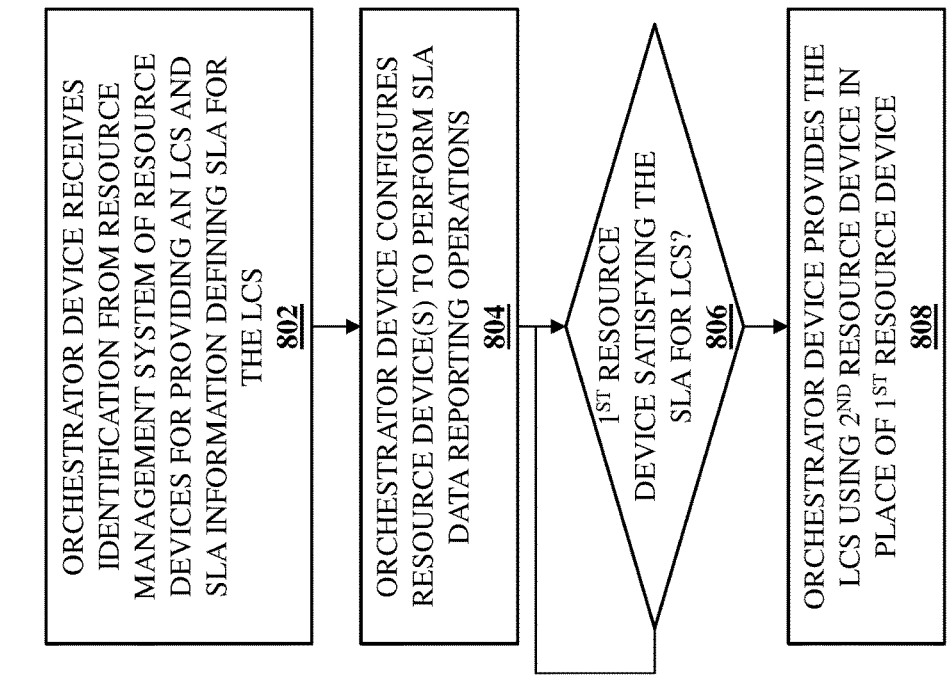
FIG. 8 is a flow chart illustrating an embodiment of a method for access control and management of resource devices used to provide an LCS.

Referring now to FIG. 8, an embodiment of a method 800 for access control and management of resource devices used to provide a Logically Composed System (LCS) is illustrated. As discussed below, the systems and methods of the present disclosure provide for the control of access to resource devices that provide an LCS, and the management of those resource devices. For example, the LCS resource device access control and management system of the present disclosure may have a resource system including an orchestrator device coupled to a resource management system and resource devices. The orchestrator device receives an identification from the resource management system of the resource devices for providing an LCS, and Service Level Agreement (SLA) information defining an SLA for the LCS. The orchestrator device uses the SLA information for the LCS to monitor each of the resource devices during their providing of the LCS and, in response, identifies a first resource device that is performing first resource device functionality that is not satisfying the SLA for the LCS. In response, the orchestrator device provides the LCS using a second resource device that performs second resource device functionality that satisfies the SLA for the LCS in place of the first resource device. As such, resource devices used to provide an LCS may be replaced with other resource devices in the event that they are not satisfying an SLA for the LCS.

As will be appreciated by one of skill in the art in possession of the present disclosure, the orchestrator device of the present disclosure operates to manage an LCS control network that is internal to the LCS provisioning system and that includes the resource devices that are used to provide LCSs, and would benefit from the ability to isolate users, their client devices, and/or the LCSs provided to them while ensuring that QoS for those LCSs is maintained by the resource devices and/or portions thereof that may be shared amongst the LCSs (e.g., the physical network ports on networking devices, the processor cores on processing systems, the bandwidth of PCIe devices, and/or other resources of resource devices that may be shared across LCSs via the physical functions and virtual functions presented to those LCSs as described herein). As such, the physical LCS control network discussed above may be configured such that it is only visible to an operating system provided by an orchestrator engine on the orchestrator device (i.e., the LCS control network is not exposed as a network endpoint to any LCS), with a network virtualization layer that is provided by the orchestrator engine on the orchestrator device "owning" the LCS control network.

Furthermore, QoS for any particular LCS may be enforced via an SLA for that LCS, and that SLA may be defined for services/functionality provided by resource device(s) (or portions thereof) and managed/controlled by the orchestrator device via physical functions or virtual functions that are presented to an LCS and that allow the LCS to access those services/functionality. For example, SLAs for LCSs may be enforced on each physical function and/or virtual function (e.g., PCIe physical/virtual functions provided via PCIe hardware and software) that is presented to an LCS in order to ensure that physical function and/or virtual function does not overconsume the resources of its associated resource device or resource device portion, while also defining a minimum/expected amount of resources that are guaranteed to the LCS. In another example, SLAs for LCSs may be enforced on virtual network instances utilized by services/functionality provided by resource device(s) or portions thereof, with enforcement pushed to hardware in the orchestrator device via, for example, a programmable data plane in the orchestrator device. In yet another example, SLAs for LCSs may be enforced on resource devices or portions thereof (e.g., processor cores in a processing system, networking ports on a networking device, PCIe bandwidth on a PCIe device, etc.) in order to enforce maximum and/or minimum resource limits for the user/client device/LCS of corresponding services/functionality provided by resource devices.

As also discussed below, an SLA data model may be defined for LCSs, and may include a granular SLA definition for each resource device that is presented to an LCS, portions of resource devices (e.g., services/functionality of those resource devices) presented to an LCS, etc. For example, a resource management system may define the SLA data model for the services/functionality provided by resource devices to each LCS, and an SLA control engine on the orchestrator device may then invoke relatively lower-level hardware on the orchestrator device to enforce the SLA for any particular LCS, its resource devices, and/or portions of resource devices with help from the resource management system.

As such, the SLA data models may provide a capabilities lexicon that describes the composed elements (e.g., resource devices or portions thereof) for the LCS, with those composed elements mapped to the LCS-objectives that are constrained by the capabilities of those elements, and with QoS for the LCS managed based on SLA information and the state of the resource devices (or portions thereof), while the orchestrator device manages resource devices based on logical resource requests from LCSs. As discussed below, the resource devices (or portions thereof) may be configured to provide telemetry and analytics data that may be used to manage their state (e.g., a logical state) and ensure QoS via the SLA enforcement described herein, and that telemetry and analytics data may be converted and parsed to determine the capabilities and resource consumption of those resource devices (or portions thereof), with filtered telemetry and analytics data analyzed to identify information about the state of resource devices (or portions thereof) as well. Thus, the orchestrator device is configured to manage the resource devices used to provide an LCS, and may perform localized optimization of resources (presented via the physical functions and/or virtual functions discussed herein) to ensure QoS guarantees via SLA enforcement in order to deliver a desired state of any LCS.

The method 800 begins at block 802 where an orchestrator device receives an identification from a resource management system of resource devices for providing an LCS and SLA information defining an SLA for the LCS. With reference back to FIG. 7, in an embodiment of block 802, the resource management system 706 may receive a workload intent from a client device and, in response, may compose an LCS based on that workload intent similarly as described above. As such, the resource management system 706 may determine that the resource device(s) 704d that are part of the SCP device 704, the resource device(s) 708 in the chassis 702 of the BMS system 701, and the resource device(s) 710 outside the chassis 702 of the BMS system 701 may be utilized to provide an LCS, and may identify those resource devices to the SCP device 704. Thus, similarly as described above, a processing system and memory system included in the resource devices 708 in the BMS system 701 may be identified for providing an operating system for the LCS, with any of the remaining resource devices 704d, 708, and 710 available to that operating system for providing functionality for the LCS.

In addition, the resource management system 706 may determine SLA information that defines an SLA for the LCS. For example, the user of the client device requesting the LCS via the workload intent discussed above may have an SLA with the LCS provisioning system, and thus a user identifier for that user may be retrieved and used to determine the SLA for the LCS being requested by the user. In another example, the resource management system 706 may define the SLA for the LCS based on the workload intent provided by the user of the client device and used to compose the LCS (which one of skill in the art in possession of the present disclosure will recognize may include requested levels of service/functionality available to that LCS), based on the resource devices that were used to compose that LCS, and/or based on any other QoS factors that would be apparent to one of skill in the art in possession of the present disclosure. However, while specific techniques for the identification of an SLA for a LCS have been described, one of skill in the art in possession of the present disclosure will appreciate how the SLA for an LCS may be determined in a variety of manners that will fall within the scope of the present disclosure as well. In an embodiment, the resource management system 706 may provide SLA information that defines the SLA for the LCS to the SCP device 704, either along with the identification of the resource devices for that LCS, or separately from the identification of the resource devices for that LCS.

As discussed above, the SLA information may be provided by the resource management system 706 to the SCP device 704 in an SLA data model that identifies each of the plurality of resource devices that may be used to provide the LCS, and at least one respective SLA requirement for each of the plurality of resource devices. For example, the resource management system 706 may translate the SLA for the LCS into an SLA data model for each of the services/functionality available from the resource device(s) composed for the LCS (e.g., with physical resource devices, resource device services/functionality, and LCS instances providing nodes and the corresponding SLA information providing the weight of the edges.) For example, one of skill in the art in possession of the present disclosure will appreciate how the LCSs described above may be composed using a blueprint to provide a "guide" to selecting resource devices and their configuration for providing that LCS, with that guide being motif-based and levering subgraph patterns and mining. As such, the BMS system/SCP device may provide an "anchor" node for the LCS, with the patterns and mining discussed above identifying possible subgraphs and weights for resource device and configuration selection, and the blueprint including "tunable" parameters for the nodes (e.g., the resource devices, services/functionality, LCS instances) and edges (SLA information) in the motif in order to allow for adjustment to meet any SLA for an LCS (i.e., based on the SLA information/guidelines discussed above).

As such, the LCS resource device access control and management system 700 may be configured to evaluate incoming LCS composition requests (e.g., the workload intents discussed above) against the available resource devices and configurations in a domain (e.g., resource devices under the control of particular orchestrator devices). Using a map of available resource devices and a topology of their configuration in a domain, the LCS composition request may be mapped to the blueprint discussed above (using LCS composition best practices or reference architectures), and that mapping may then be used to determine possible LCS compositions that are available. Telemetry data may then be captured for the resource devices in the mapping, and a selection of a best available LCS configuration may then be made based on subgraph matching. The SLA for the LCS may be factored into the subgraph matching and may set the metrics capture and tracing that will be performed for the LCS during its operation. As will be appreciated by one of skill in the art in possession of the present disclosure, the SLA for the LCS may provide a set of guidelines mapped to perform analytics on that LCS (e.g., via the SCP device) across all resource devices that provide the LCS, and the aggregate of those analytics may be used to determine the performance of the LCS per the SLA, which may then compared to a desired LCS outcome. If that desired LCS outcome is not met, then the LCS composition may be adjusted, either via the adjustment of resource-level attributes, or adjusting specific resources that are used to provide the LCS.

As will be appreciated by one of skill in the art in possession of the present disclosure, the SLA data model discussed above may provide a communication abstraction for SLA enforcement by the SCP device 704, and may identify resources that may be consumed via each service/functionality available from a resource device (e.g., processing resources, memory resources, accelerator resources, networking resources, etc.), as well as the SLA for services/functionality that is presented by the orchestrator device to LCSs via the physical functions 714a/716a and virtual functions 714b/716b. The detailed SLA definition provided by the SLA information may then be provided to the SLA control engine 704b on the SCP device 704.

The method 800 then proceeds to block 804 where the orchestrator device configures one or more of the resource devices to perform SLA data reporting operations. In an embodiment, at block 804, the SLA control engine 704b in the SCP device 704 may utilize the detailed SLA definition provided by the SLA information that was received from the resource management system 706 to configure hardware on the SCP device 704 to perform SLA enforcement across one or more of the resource devices used to provide the LCS. For example, for the resource devices 704d and 710 that are under the control of the SCP device 704, the resource specific SLA configuration service engine(s) 704d may configure those resource devices 704d and 710 to report back telemetry data and/or other SLA data to the SLA control engine 704b by, for example, configuring tunnels for those resource devices to provide the LCS, and then monitoring the data transmitted via those tunnels by the resource devices. As will be appreciated by one of skill in the art in possession of the present disclosure, for the resource device(s) 710 located outside of the chassis 702 of the BMS system 701, the SCP device(s) in the resource system(s) that include those resource device(s) 710 may monitor the operation of those resource device(s) 710 in a similar manner. As will be appreciated by one of skill in the art in possession of the present disclosure, the resource device(s) 708 in the chassis 702 of the BMS system 701 may report back limited telemetry data to the SLA control engine 704b via the "side-band", "out-of-band", or management interface, but not to the extent provided by the resource device(s) 704d and 710 discussed above.

The method 800 then proceeds to decision block 806 where it is determined whether a first resource device is satisfying the SLA for the LCS. Similarly as discussed above, following block 804, the SCP device 704 may configure the resource device(s) 708, 704d, and 710 to provide an LCS by configuring the physical functions 714a and/or virtual functions 714b for the resource devices 708 (e.g., on the "all-or-nothing" basis as discussed above), as well as configuring the physical functions 716a and/or virtual functions 716b for the resource devices 704d and 710 and/or portions thereof. Thus, any of the resource devices 708 providing the LCS may be presented in their entirety to that LCS via the physical functions 714a and/or virtual functions 714b, while any portion of the resource devices 704d and 710 providing the LCS may be presented to that LCS via the physical functions 716a and/or virtual functions 716b. As such, the LCS may operate via an operating system provided by the resource devices 708, and may utilize any of the resource devices 708 in their entirety via the physical functions 714a and/or virtual functions 714b, as while utilizing the resource devices 704d and 710 (or portions thereof) via the physical functions 716a and/or virtual functions 716b.

In an embodiment, at decision block 806, the SCP engine 704a may monitor the resource device(s) 704d and 710 and/or portions thereof via their corresponding physical functions 716a and/or virtual functions 716b to determine whether they are satisfying the SLA for the LCS. One of skill in the art in possession of the present disclosure will appreciate that the "first resource device" referred to as being monitored in decision block 806 may be any particular resource device that is operating to provide the LCS, and thus decision block 806 may be performed for any of the resource devices 704d and 710 and/or portions thereof being used to provide the LCS. As discussed above, each of the resource devices 708 being used to provide the LCS may be associated with SLA information that defines the characteristics of resource device functionality performed by that resource device, and each of the resource devices 704d and/or 710 (or portions thereof) may be associated with SLA information that defines the characteristics of resource device functionality performed by that resource device (or portion thereof), and thus decision block 806 may include the SCP engine 704a checking the telemetry and/or analytics data reported by the resource devices 708, 704d, and 710 (or portions of the resource devices 704d and 710) against their respective SLA information in order to determine whether the SLA for the LCS is being satisfied.

If, at decision block 806, it is determined that the first resource device is performing first resource device functionality that satisfies the SLA for the LCS that defines the characteristics required for that first resource device functionality, the method 800 returns to decision block 806. As such, the method 800 may loop such that the SCP engine 704a operates to monitor the resource devices 704d and 710 and/or portions thereof being used to provide the LCS until one of those resource devices is performing resource device functionality that is no longer satisfying the SLA for the LCS that defines the characteristics required for that resource device functionality.

If at decision block 806, it is determined that the first resource device is not satisfying the SLA for the LCS, the method 800 proceeds to block 808 where the orchestrator device provides the LCS using a second resource device in place of the first resource device. In an embodiment, at block 808 and in response to determining that one of the resource devices 708, or the resource devices 704d and 710 (or portions thereof), being used to provide the LCS is performing resource device functionality that is no longer not satisfying an SLA for the LCS that defines the characteristics required for that resource device functionality, the SCP engine 704a may generate an SLA violation alert, and the SCP engine 704a may then operate to provide that LCS using a second resource device in place of the first resource device. In one example, in response to determining that one of the resource devices 708, or the resource devices 704*d* and 710 (or portions thereof), being used to provide the LCS is performing resource device functionality that is no longer not satisfying an SLA for the LCS that defines the characteristics required for that resource device functionality, the SLA control engine 704*b* may determine that another of the resource devices 708, or the resource devices 704*d* and 710 (or portions thereof), that is configured to perform resource device functionality that satisfies the SLA for the LCS that defines the characteristics required for that resource device functionality. In another example, in response to determining that one of the resource devices 708, or the resource devices 704*d* and 710 (or portions thereof), being used to provide the LCS is performing resource device functionality that is no longer not satisfying an SLA for the LCS that defines the characteristics required for that resource device functionality, the SLA control engine 704*b* may communicate with the resource management system 706 to identify the second resource device that performs the second resource device functionality that satisfies the SLA for the LCS that defines the characteristics required for that resource device functionality.

In an embodiment, each of the resource devices 704*d* and 710 providing the LCS may be viewed by the SCP device 704 as provided by N "slices" or portions, and the SCP engine 704*a* may be configured to provide any number of those slices/portions for use by the LCS based on the SLA for that LCS, as well as to dynamically adjust the allocation of such slices/portions to, for example, allow for "bursty" data traffic from a particular service or LCS (e.g., by adjusting the number of slices/portions of a networking device used to provide the LCS). As such, the SCP device 704 is configured to dynamically reconfigure the services/functionality provided by the resource device(s) 704*d* and 710 to an LCS in order to satisfy the SLA for that LCS. As such, the SCP device 704 may operate to provide resource devices (or portions thereof) for use by an LCS and control those resource devices (and/or their resources) to provide for a desired operation of the LCS, while optimizing resource device presentation and utilization by the LCS, in a manner that satisfies the SLA for the LCS.

Thus, systems and methods have been described that provide for the control of access to resource devices that provide an LCS, and the management of those resource devices. For example, the LCS resource device access control and management system of the present disclosure may have a resource system including an orchestrator device coupled to a resource management system and resource devices. The orchestrator device receives an identification from the resource management system of the resource devices for providing an LCS, and Service Level Agreement (SLA) information defining an SLA for the LCS. The orchestrator device uses the SLA information for the LCS to monitor each of the resource devices during their providing of the LCS and, in response, identifies a first resource device that is performing first resource device functionality that is not satisfying the SLA for the LCS. In response, the orchestrator device provides the LCS using a second resource device that performs second resource device functionality that satisfies the SLA for the LCS in place of the first resource device. As such, resource devices used to provide an LCS may be replaced with other resource devices in the event that they are not satisfying an SLA for the LCS.

As discussed above, the LCS resource device access control and management system 700 discussed above is constrained by limitations in the ability of the orchestrator device to assign portions of resource devices in the BMS system (e.g., they must be assigned "all-or-nothing" to any particular LCS), as well as the ability of the orchestrator device to create physical functions and/or virtual functions (which is limited by the hardware availability in the orchestrator device) in a number that may be required to ensure each user/client device/LCS provided by the BMS system is isolated from each other. As such, the LCS resource device access control and management system 700 operates to bifurcate control of resource devices providing an LCS between the orchestrator device (i.e., over the resource devices it is capable of controlling) and the BMS control system (i.e., over the resource devices the orchestrator device is not capable of controlling).

Furthermore, the access control/isolation of LCSs in the LCS resource device access control and management system 700 discussed above may also be limited by the physical BMS host presentation, as the user/client device may be able to "see" and/or have access to any of the resource device(s) 708 exposed by a Basic Input/Output System (BIOS) in the BMS system 701, as well as have access to other resource devices that are not specifically controlled by the SCP device 704 (i.e., resource devices other than the resource devices 704*d* and 710). However, the inventors of the present disclosure have recognized that segmentation/isolation of multiple users/client devices and their LCSs from the physical resource devices used to provide those LCSs may be accomplished via intermediation functionality added to the BMS system 701.

While one option for such intermediation is to use the BIOS in the BMS system 701 to customize presentation of LCSs to users/client devices, such a solution will not scale well, and presents issues associated with the relative complexity in adapting conventional BIOS architectures to the wide variations of LCS provisioning systems and subsystems, while requiring a BIOS-resident agent to act as a supervisory control agent. One of skill in the art in possession of the present disclosure will appreciate how the BIOS is not well-suited to provide such a multi-threaded control subsystem during runtime of the BMS system. Furthermore, the environment would need to be customized, with mapping of resource devices across different domains, coordination of multiple unconnected control planes, and linking of non-coordinated outcome management.

The inventors of the present disclosure instead have developed a presentation/management subsystem for the BMS system 701 that provides a common supervisory agent that connects the LCS provisioning internal fabric, the orchestrator device, and the BMS resource devices via a common control plane. Furthermore, an agent in the orchestrator device may control resource device mapping from the internal LCS provisioning fabric to any particular LCS, processing system and memory system allocation from the resource devices in the BMS, physical function/virtual function generation, and the mapping of processing systems, processing cores, and interrupts. As such, LCS composition requests discussed above may describe the state and outcome for an LCS, with the agent in the orchestrator device managing the BMS system, the operating system provided by the BMS system, and/or other elements of the BMS system, which one of skill in the art in possession of the present disclosure will appreciate limits the footprint of external control on any composed system, LCS, or state management subsystem. As such, the presentation/management subsystem of the present disclosure may operate as a single point of state management while providing coordinated user/client device management for purposes of security and QoS. Furthermore, a common Application Programming Interface (API) may be implemented, for example, by extending existing "libvirt" API tools to support the orchestrator-device-based LCS control described below, while allowing the coordination of lifecycle management from that single point, and optimized SLA delivery for LCSs.

As such, the presentation/management subsystem of the present disclosure provides a centralized controller for each LCS provided by a BMS system in which it is located, and allows the orchestrator device in that BMS system to see any resource devices in that BMS system (e.g., the resource devices 708 discussed above) and monitor their operation to ensure SLA for a corresponding LCS is satisfied. Furthermore, one of skill in the art in possession of the present disclosure will appreciate how the ability of the orchestrator device to see all of the resource devices in the BMS system (via the centralized controller provided by the presentation/management subsystem) allow for relatively better multi-user/client device/LCS security modules to be utilized in the LCS provisioning system.

Figure 9:
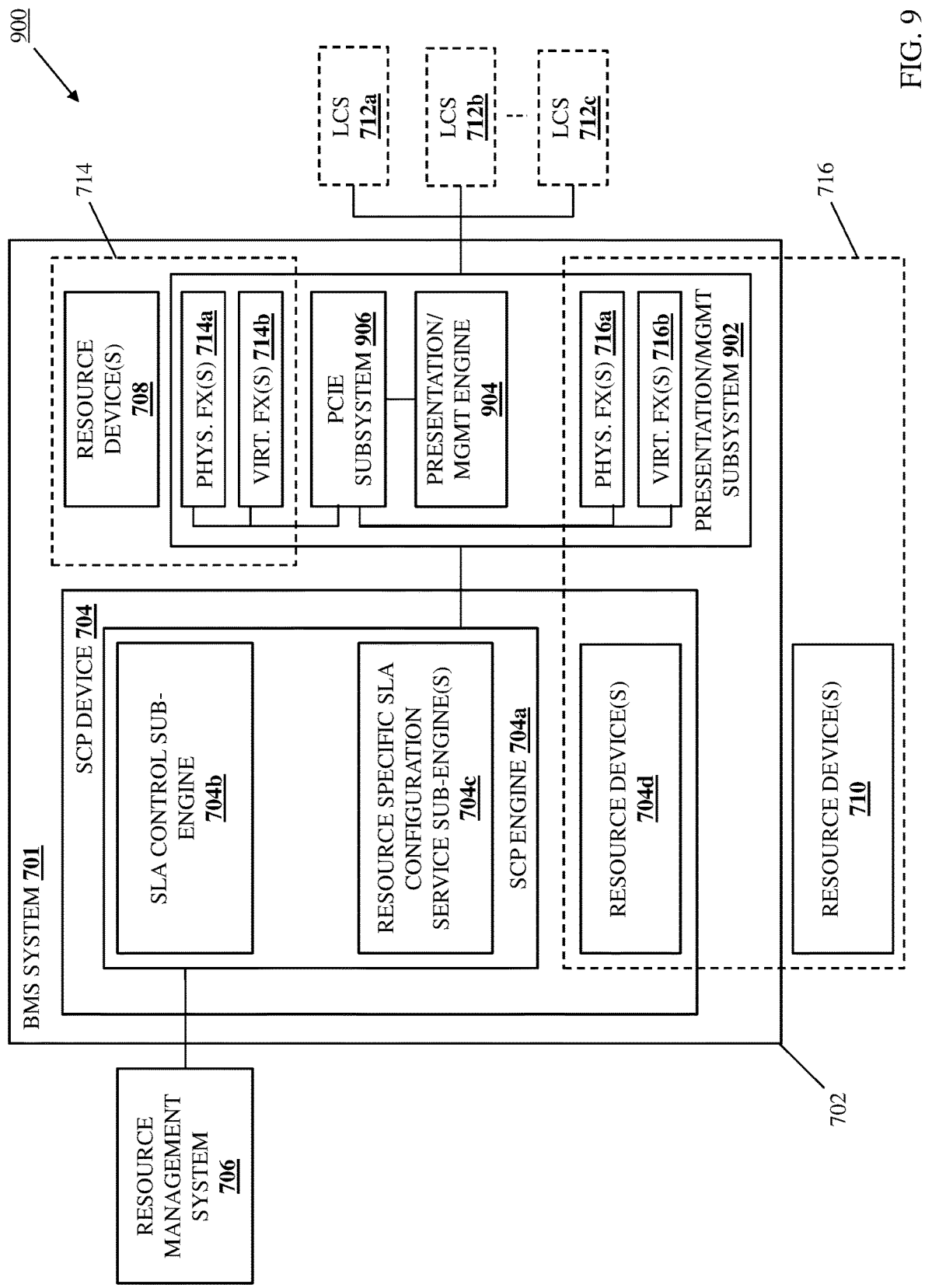
FIG. 9 is a schematic view illustrating an embodiment of an LCS resource device access control and management system provided according to the teachings of the present disclosure.

With reference to FIG. 9, an embodiment of a LCS resource device access control and management system 900 is illustrated that provides the presentation/management subsystem of the present disclosure in the LCS resource device access control and management system 700 discussed above with reference to FIG. 7, and thus similar components have been provided with similar reference numbers. As can be seen in FIG. 9, the LCS resource device access control and management system 900 includes a presentation/management subsystem 902 in the chassis 702 of the BMS system 701. The presentation/management subsystem 902 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a presentation/management engine 904 that is configured to perform the functionality of the presentation/management engines and/or presentation/management subsystems discussed below.

The presentation/management subsystem 902 may also include a PCIe subsystem 906 that is coupled to the presentation/management engine 904 and that is configured to provide the physical functions 714a and virtual functions 714b discussed above with reference to FIG. 7, as well as the physical functions 716a and virtual functions 716b discussed above with reference to FIG. 7. FIG. 9 also illustrates how the SCP device 704 is coupled to the presentation/management subsystem 902, and the presentation/management subsystem 902 is coupled to the LCSs 712a-712c. As discussed below, the presentation/management subsystem 902 may operate as an intermediary/agent in the BMS system 701 that intermediates the presentation and management of resource devices in the BMS system 701 to an LCS, allowing for granularity in the presentation of portions of the resource device(s) 708, and more granularity in the presentation of the resource device(s) 704d and 710, to any of the LCSs 712a-712c. As such, one of skill in the art in possession of the present disclosure will appreciate how the presentation/management subsystem 902 may be configured to control the resource device(s) 708 in a manner that allows the granularity in the presentation of portions of the resource device(s) 708 discussed below, and may include hardware resources that allow for the granularity in the presentation of the resource device(s) 704d and 710 discussed below.

Figure 10:
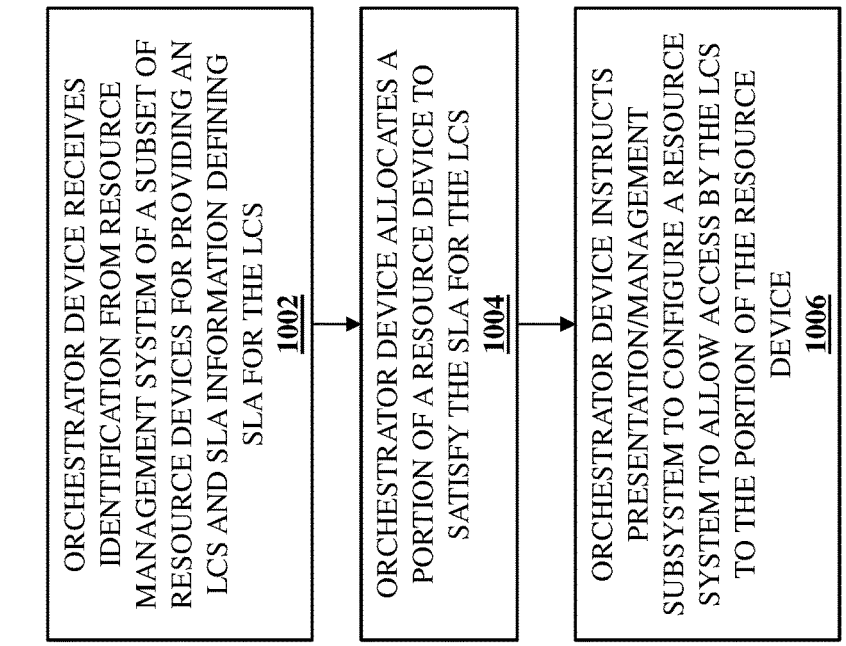
FIG. 10 is a flow chart illustrating an embodiment of a method for access control and management of resource devices used to provide an LCS.

Referring now to FIG. 10, an embodiment of a method 1000 for access control and management of resource devices used to provide a Logically Composed System (LCS) is illustrated. As discussed below, the systems and methods of the present disclosure provide for the control of access to resource devices that provide an LCS, and the management of those resource devices. For example, the LCS resource device access control and management system of the present disclosure may include an orchestrator device in a resource system that is coupled to a resource management system, resource devices, and a presentation/management subsystem. The orchestrator device receives an identification from the resource management system of a first subset of the resource devices for providing a first LCS, and first Service Level Agreement (SLA) information defining a first SLA for the first LCS. Based on the first SLA information, the orchestrator device allocates a first portion of a first resource device included in the resource devices to satisfy the first SLA for the first LCS, and provides a first resource device portion configuration instruction to the presentation/management subsystem that is configured to cause the presentation/management subsystem to configure the resource system to allow the first LCS to access and utilize the first portion of the first resource device. As such, resource devices used to provide an LCS may be presented to an LCS via an intermediary that allows for more granularity in the presentation of those resource devices than is available without that intermediary.

As will be appreciated by one of skill in the art in possession of the present disclosure the method 1000 may be performed concurrently with, or as part of, the method 800, and thus the operations described above as being performed during the method 800 may be performed along with the operations described as being performed during the method 1000 in order to allow the orchestrator device to monitor resource devices to determine whether they are satisfying an SLA for an LCS and, if not, replace those resource devices with resource devices that can satisfy that SLA for that LCS. As such, one of skill in the art in possession of the present disclosure will appreciate how the operations described for the method 1000 may be performed in order to allow more granular resource device presentation than is available via the method 800, while still allowing the SLA monitoring and enforcement functionality that is described above as being performed during the method 800.

The method 1000 may begin at block 1002 where an orchestrator device receives identification from a resource management system of a subset of resource devices for providing an LCS and SLA information defining an SLA for the LCS. Similarly as described above as part of the method 800, in an embodiment of block 1002, the resource management system 706 may receive a workload intent from a client device and, in response, may compose an LCS based on that workload intent similarly as described above. As such, the resource management system 706 may determine that subsets of the resource device(s) 704d that are part of the SCP device 704, the resource device(s) 708 in the chassis 702 of the BMS system 701, and the resource device(s) 710 outside the chassis 702 of the BMS system 701 may be utilized to provide an LCS, and may identify the subset of those resource devices to the SCP device 704. Thus, similarly as described above, a processing system and memory system included in the resource devices 708 in the BMS system 701 may be identified for providing an operating system for the LCS, with any of the remaining resource devices 704d, 708, and 710 available to that operating system for providing functionality for the LCS.

In addition, the resource management system 706 may determine SLA information that defines an SLA for the LCS. For example, the user of the client device requesting the LCS via the workload intent discussed above may have an SLA with the LCS provisioning system, and thus a user identifier for that user may be retrieved and used to determine the SLA for the LCS being requested by the user. In another example, the resource management system 706 may define the SLA for the LCS based on the workload intent provided by the user of the client device and used to compose the LCS (which one of skill in the art in possession of the present disclosure will recognize may include requested levels of service/functionality available to that LCS), based on the resource devices that were used to compose that LCS, and/or based on any other QoS factors that would be apparent to one of skill in the art in possession of the present disclosure. However, while specific techniques for the identification of an SLA for a LCS have been described, one of skill in the art in possession of the present disclosure will appreciate how the SLA for an LCS may be determined in a variety of manners that will fall within the scope of the present disclosure as well. In an embodiment, the resource management system 706 may provide SLA information that defines the SLA for the LCS to the SCP device 704, either along with the identification of the resource devices for that LCS, or separately from the identification of the resource devices for that LCS.

Similarly as discussed above, the SLA information may be provided by the resource management system 706 to the SCP device 704 in an SLA data model that identifies each of the plurality of resource devices that may be used to provide the LCS, and at least one respective SLA requirement for each of the plurality of resource devices. Similarly as described above, the resource management system 706 may translate the SLA for the LCS into an SLA data model for each of the services/functionality available from the resource device(s) composed for the LCS (e.g., with physical resource devices, resource device services/functionality, and LCS instances providing nodes and the corresponding SLA information providing the weight of the edges.) As will be appreciated by I in the art in possession of the present disclosure, the SLA data model discussed above may provide a communication abstraction for SLA enforcement by the SCP device 704, and may identify resources that may be consumed via each service/functionality available from a resource device (e.g., processing resources, memory resources, accelerator resources, networking resources, etc.), as well as the SLA for services/functionality that is presented by the orchestrator device to LCSs via the physical functions 714*a*/716*a* and virtual functions 714*b*/716*b*. The detailed SLA definition provided by the SLA Information may then be provided to the SLA control engine 704*b* on the SCP device 704.

The method 1000 the proceeds to block 1004 where the orchestrator device allocates a portion of a resource device to satisfy the SLA for the LCS. In an embodiment, at block 1004, the SCP device 704 may allocate a portion of at least one of the subset of the resource devices 708, 704*d*, and 710 to satisfy the SLA for the LCS. In the examples provided below, the SCP device 704 allocates a portion (e.g., a service/functionality) of one of the resource device(s) 708, a portion (e.g., a service/functionality) of one of the resource device(s) 704*d*, and a portion (e.g., a service/functionality) of one of the resource device(s) 710, but I in the art in possession of the present disclosure will appreciate that a portion of any resource device available for providing an LCS may be allocated to satisfy an SLA for that LCS while remaining within the scope of the present disclosure as well.

The method 1000 the proceeds to block 1006 where the orchestrator device instructs a presentation/management subsystem to configure a resource system to allow access by the LCS to the portion of the resource device. In an embodiment, at block 1006, the SCP engine 704*a* in the SCP device 704 may generate an instruction to configure the BMS system 701 to allow access by the LCS to the portion of the resource device allocated for that LCS at block 1004, and may transmit that instruction to the presentation/management subsystem 902. As such, continuing with the specific examples provided above, the SCP engine 704*a* in the SCP device 704 may generate an instruction to configure the BMS system to allow access by the LCS to the portion (e.g., the service/functionality) of one of the resource device(s) 708, and may transmit that instruction to the presentation/management subsystem 902. Similarly, the SCP engine 704*a* in the SCP device 704 may generate an instruction to configure the BMS system to allow access by the LCS to the portion (e.g., the service/functionality) of one of the resource device(s) 704*d*, and may transmit that instruction to the presentation/management subsystem 902. Similarly, the SCP engine 704*a* in the SCP device 704 may generate an instruction to configure the BMS system to allow access by the LCS to the portion (e.g., the service/functionality) of one of the resource device(s) 710, and may transmit that instruction to the presentation/management subsystem 902.

In an embodiment, in response to receiving the instruction to configure the BMS system to allow access by the LCS to the portion (e.g., the service/functionality) of one of the resource device(s) 708, the presentation/management subsystem 902 may configure the physical functions 714*a* and/or virtual functions 714*b* to allow access by the LCS to the portion (e.g., the service/functionality) of one of the resource device(s) 708. In an embodiment, in response to receiving the instruction to configure the BMS system to allow access by the LCS to the portion (e.g., the service/functionality) of one of the resource device(s) 704*d*, the presentation/management subsystem 902 may configure the physical functions 716*a* and/or virtual functions 716*b* to allow access by the LCS to the portion (e.g., the service/functionality) of one of the resource device(s) 704*d*. In an embodiment, in response to receiving the instruction to configure the BMS system to allow access by the LCS to the portion (e.g., the service/functionality) of one of the resource device(s) 710, the presentation/management subsystem 902 may configure the physical functions 716*a* and/or virtual functions 716*b* to allow access by the LCS to the portion (e.g., the service/functionality) of one of the resource device(s) 710. Furthermore, one of skill in the art in possession of the present disclosure will appreciate how the presentation/management subsystem 902 may configure different LCSs to access different portions of the same resource device included in the resource device(s) 708, 704*d*, and/or 700 (i.e., with a first LCS configured to access a first portion of one of the resource device(s) 708, 704*d*, and/or 710, and a second LCS configured to access a second portion of that resource device.

As such, the LCS resource device access control and management system 900 allows portions of the resource device(s) 708 that are included in the chassis 702 of the BMS system 701 (but not as part of the SCP device 704) to be presented to the LCS, as opposed to the LCS resource device access control and management system 700 that presents any one of those resource devices 708 in an "all-or-nothing" manner to any particular LCS. Furthermore, the LCS resource device access control and management system 900 allows many more portions of the resource device(s) 704d that are included in the SCP device 704 and/or the resource device(s) 710 that are connected to the SCP device via a network to be presented to the LCS (as compared to the LCS resource device access control and management system 700) via dedicated resources on the presentation/management subsystem 902 that allow the presentation/management subsystem 902 to create as many physical functions and/or virtual functions as are needed in order to ensure user/client device/LCS isolation and/or enforce QoS requirements on resource device use.

As will be appreciated by one of skill in the art in possession of the present disclosure, in a conventional system the operating system may interface directly with any single hardware device (e.g., a PCIe NIC Add-In Card (AIC)), and operating-system-to-driver interactions with a physical function provided for that hardware device will allow the operating system to access and use all of the hardware device functionality. As such, any physical functions and virtual functions native to that hardware device will all be allocated by the operating system driver in their entirety to the operating system, thus dedicating the entire hardware device to the operating system. To provide a specific example, conventional drivers that use Single Root Input/Output Virtualization (SRIOV) (and that one of skill in the art in possession of the present disclosure would appreciate would enable virtual functions) are required to allocate 100% of any resource requested by the operating system to virtual functions when the first virtual function is created. As such, in a conventional system, once the choice of a virtual function/physical function SLA is made, that choice is "locked in".

To contrast, in a composed LCS like that provided by the BMS system 701 in which there is not a one-to-one relationship between any particular physical resource device (e.g., one of the resource device(s) 708) and the physical functions (e.g., the physical functions 714a) and any backing resources (e.g., resource devices exposed as virtual functions 714b), the resource management system (e.g., the resource management system 706) is not required to dedicate 100% of any physical resource device to any physical function 714a, and therefore the LCSs that utilize those physical functions 714a need not be dedicated 100% of any available resource device. As will be appreciated by one of skill in the art in possession of the present disclosure, this allows the provisioning of more granular and incremental approaches to resource device consumption that allow a subset of any of the resource devices 708 (i.e., a portion of their functionality) to be utilized by providing corresponding physical functions for those subsets/functionality. However, the system still must consider the total functionality available from any of the resource devices 708. For example, in a typical PCIe NIC AIC, only one or two physical functions might be necessary to fully consume the capacity of that PCIe NIC AIC. As such, the SCP device 704 and resource management system 706 may operate to provide the minimum capacity requested by an LCSA from that PCIe NIC AIC in order to allow that PCIe NIC AIC to be shared by more than one LCS, which allows the BMS system 701 to then provide reserve capacity of that PCIe NIC AIC to support other physical functions and/or virtual functions from the PCIe NIC AIC that may be consumed by other LCSs.

While not described in detail with reference to the method 1000, one of skill in the art in possession of the present disclosure will appreciate how the incorporation of the method 1000 into the method 800 may allow the SCP device 704 to use SLA information for the any LCS to monitor the portion of any resource device during its providing of the LCS and, in response, identify whether that portion of that resource device is performing resource device functionality that is not satisfying the SLA for the LCS. In the event that portion of that resource device is performing resource device functionality that is not satisfying the SLA for the LCS, the SCP device 704 may then provide the LCS using a different resource device that performs resource device functionality that satisfies the SLA for the LCS in place of the portion of the resource device that was performing the resource device functionality that was not satisfying the SLA for the LCS.

As such, while the LCS resource device access control and management system 700 allows the use of physical functions and/or virtual functions to present resource devices (or portions thereof for resource devices controller by the orchestrator device) to an LCS, the presentation/management subsystem 902 provided in the LCS resource device access control and management system 900 may also allow for the monitoring of the physical functions and/or virtual functions in order to, for example, identify when an LCS attempts to access their corresponding resource device. As such, the presentation/management subsystem 902 may allow the SCP device 704 to monitor access to a portion of a resource device that is allocated to a first LCS via the physical function and/or virtual function being used to present it and, in response, detect that a second LCS is attempting to access that portion of that resource device and, in response, generate an unauthorized access attempt report.

Thus, systems and methods have been described that provide for the control of access to resource devices that provide for the control of access to resource devices that provide an LCS, and the management of those resource devices. For example, the LCS resource device access control and management system of the present disclosure may include an orchestrator device in a resource system that is coupled to a resource management system, resource devices, and a presentation/management subsystem. The orchestrator device receives an identification from the resource management system of a first subset of the resource devices for providing a first LCS, and first Service Level Agreement (SLA) information defining a first SLA for the first LCS. Based on the first SLA information, the orchestrator device allocates a first portion of a first resource device included in the resource devices to satisfy the first SLA for the first LCS, and provides a first resource device portion configuration instruction to the presentation/management subsystem that is configured to cause the presentation/management subsystem to configure the resource system to allow the first LCS to access and utilize the first portion of the first resource device. As such, resource devices used to provide an LCS may be presented to an LCS via an intermediary that provides more granularity in the presentation of those resource devices than is available without that intermediary.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) resource device access control and management system, comprising:
a resource management system;
a plurality of resource devices; and
a resource system including an orchestrator device that is coupled to the resource management system and the plurality of resource devices, wherein the orchestrator device is configured to:
receive, from the resource management system, an identification of the plurality of resource devices for providing an LCS, and Service Level Agreement (SLA) information defining an SLA for the LCS;
monitor, using the SLA information defining the SLA for the LCS, each of the plurality of resource devices during their providing of the LCS;
identify, in response to the monitoring of each of the plurality of resource devices during their providing of the LCS, a first resource device that is included in the plurality of resource devices and that is performing first resource device functionality that is not satisfying the SLA for the LCS; and
provide, in response to identifying the first resource device that is performing the first resource device functionality that is not satisfying the SLA for the LCS, the LCS using a second resource device that performs second resource device functionality that satisfies the SLA for the LCS in place of the first resource device that was performing the first resource device functionality that was not satisfying the SLA for the LCS.

2. The system of claim 1, wherein the SLA information is received in an SLA data model that identifies each of the plurality of resource devices and at least one respective SLA requirement for each of the plurality of resource devices.

3. The system of claim 1, wherein the orchestrator device is configured to:
configure at least a subset of the plurality of resource devices to perform SLA data reporting operations that report SLA data to the orchestrator device that is used in the monitoring of each of the plurality of resource devices.

4. The system of claim 1, wherein the providing the LCS using the second resource device in place of the first resource device includes:
communicating with the resource management system to identify the second resource device that performs the second resource device functionality that satisfies the SLA for the LCS.

5. The system of claim 1, wherein a subset of the plurality of resource devices are included in the resource system.

6. The system of claim 5, wherein the subset of the plurality of resource devices are included on the orchestrator device.

7. The system of claim 1, wherein a subset of the plurality of resource devices are located outside of the resource system and are coupled to the orchestrator device via a network.

8. An Information Handling System (IHS), comprising:
a processing system; and
a memory system that is coupled to the processing system and that includes instructions that, when executed by the processing system, cause the processing system to provide an orchestrator engine that is configured to:
receive, from a resource management system, an identification of a plurality of resource devices for providing an LCS, and Service Level Agreement (SLA) information defining an SLA for the LCS;
monitor, using the SLA information defining the SLA for the LCS, each of the plurality of resource devices during their providing of the LCS;
identify, in response to the monitoring of each of the plurality of resource devices during their providing of the LCS, a first resource device that is included in the plurality of resource devices and that is performing first resource device functionality that is not satisfying the SLA for the LCS; and
provide, in response to identifying the first resource device that is performing the first resource device functionality that is not satisfying the SLA for the LCS, the LCS using a second resource device that performs second resource device functionality that satisfies the SLA for the LCS in place of the first resource device that was performing the first resource device functionality that was not satisfying the SLA for the LCS.

9. The IHS of claim 8, wherein the SLA information is received in an SLA data model that identifies each of the plurality of resource devices and at least one respective SLA requirement for each of the plurality of resource devices.

10. The IHS of claim 8, wherein the orchestrator engine is configured to:
configure at least a subset of the plurality of resource devices to perform SLA data reporting operations that report SLA data to the orchestrator engine that is used in the monitoring of each of the plurality of resource devices.

11. The IHS of claim 8, wherein the providing the LCS using the second resource device in place of the first resource device includes:
communicating with the resource management system to identify the second resource device that performs the second resource device functionality that satisfies the SLA for the LCS.

12. The IHS of claim 8, wherein a subset of the plurality of resource devices are included in a resource system that includes the processing system and the memory system.

13. The IHS of claim 8, wherein a subset of the plurality of resource devices are located outside of a resource system that includes the processing system and the memory system, and are coupled to the processing system via a network.

14. A method for access control and management of resource devices used to provide a Logically Composed System (LCS), comprising:
receiving, by an orchestrator device from a resource management system, an identification of a plurality of resource devices for providing an LCS, and Service Level Agreement (SLA) information defining an SLA for the LCS;
monitoring, by the orchestrator device using the SLA information defining the SLA for the LCS, each of the plurality of resource devices during their providing of the LCS;
identifying, by the orchestrator device in response to the monitoring of each of the plurality of resource devices during their providing of the LCS, a first resource device that is included in the plurality of resource devices and that is performing first resource device functionality that is not satisfying the SLA for the LCS; and
providing, by the orchestrator device in response to identifying the first resource device that is performing the first resource device functionality that is not satisfying the SLA for the LCS, the LCS using a second resource device that performs second resource device functionality that satisfies the SLA for the LCS in place of the first resource device that was performing the first resource device functionality that was not satisfying the SLA for the LCS.

15. The method of claim 14, wherein the SLA information is received in an SLA data model that identifies each of the plurality of resource devices and at least one respective SLA requirement for each of the plurality of resource devices.

16. The method of claim 14, further comprising:

configuring, by the orchestrator device, at least a subset of the plurality of resource devices to perform SLA data reporting operations that report SLA data to the orchestrator engine that is used in the monitoring of each of the plurality of resource devices.

17. The method of claim 14, wherein the providing the LCS using the second resource device in place of the first resource device includes:

communicating with the resource management system to identify the second resource device that performs the second resource device functionality that satisfies the SLA for the LCS.

18. The method of claim 14, wherein a subset of the plurality of resource devices are included in a resource system that includes the orchestrator device.

19. The method of claim 18, wherein the subset of the plurality of resource devices are included on the orchestrator device.

20. The method of claim 14, wherein a subset of the plurality of resource devices are located outside of a resource system that includes the orchestrator device, and are coupled to the orchestrator device via a network.

* * * * *